(12) United States Patent
Uozumi

(10) Patent No.: US 11,214,138 B2
(45) Date of Patent: Jan. 4, 2022

(54) UTILITY VEHICLE

(71) Applicant: KAWASAKI JUKOGYO KABUSHIKI KAISHA, Kobe (JP)

(72) Inventor: Yoshinobu Uozumi, Amagasaki (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 203 days.

(21) Appl. No.: 16/669,807

(22) Filed: Oct. 31, 2019

(65) Prior Publication Data
US 2021/0129661 A1    May 6, 2021

(51) Int. Cl.
*B60K 11/08* (2006.01)
*B60S 1/68* (2006.01)
*B62D 25/08* (2006.01)
*B62D 35/02* (2006.01)
*B62D 35/00* (2006.01)

(52) U.S. Cl.
CPC .............. *B60K 11/085* (2013.01); *B60S 1/68* (2013.01); *B62D 25/08* (2013.01); *B62D 35/005* (2013.01); *B62D 35/02* (2013.01)

(58) Field of Classification Search
CPC ....... B60K 11/085; B60K 11/04; B60K 11/08; B62D 35/02; B62D 35/005; B60Y 2200/20; B60Y 2200/124; B60S 1/68; B60S 1/685; B60R 19/52; B60R 19/54
See application file for complete search history.

(56) References Cited

U.S. PATENT DOCUMENTS

| | | | | |
|---|---|---|---|---|
| 3,309,847 A | * | 3/1967 | Donaldson | B60K 11/04 55/282.4 |
| 4,018,270 A | * | 4/1977 | Kolinger | B60K 11/00 165/119 |
| 4,057,105 A | * | 11/1977 | Bailey | B60K 11/04 165/119 |
| 4,116,265 A | * | 9/1978 | Staebler | B60K 11/04 165/103 |
| 4,924,826 A | * | 5/1990 | Vinson | F01P 7/12 123/195 C |
| 5,901,786 A | | 5/1999 | Patel et al. | |
| 6,192,838 B1 | * | 2/2001 | Matsuo | B60K 11/08 123/41.01 |
| 6,203,287 B1 | * | 3/2001 | Hendrix | F01P 11/12 165/119 |

(Continued)

*Primary Examiner* — Hung Q Nguyen
(74) *Attorney, Agent, or Firm* — Alleman Hall Creasman & Tuttle LLP

(57) ABSTRACT

Provided is a utility vehicle that can efficiently take the traveling wind into a vehicle and discharge muddy water and earth and sand that enter a passage for taking in the traveling wind to the outside of the vehicle. The utility vehicle includes an opening formed on the vehicle body, the opening through which a traveling wind can be taken into the vehicle body when the vehicle body travels, a radiator capable of cooling a coolant for cooling a driving source by exchanging heat with the traveling wind taken in from the opening, a passage that is provided between the opening and the radiator and guides the traveling wind taken in from the opening to the radiator, and a discharge mechanism that performs discharge operation to discharge foreign matter to outside when the foreign matter enters inside of the passage together with the traveling wind.

12 Claims, 11 Drawing Sheets

(56) References Cited

U.S. PATENT DOCUMENTS

| | | | | |
|---|---|---|---|---|
| 7,497,287 | B2* | 3/2009 | Kunikata | B60K 11/04 |
| | | | | 180/68.1 |
| 8,097,050 | B2* | 1/2012 | Johnson | B01D 46/10 |
| | | | | 55/289 |
| 10,875,384 | B2* | 12/2020 | Sato | B60H 1/00899 |
| 2005/0230162 | A1* | 10/2005 | Murayama | B62D 25/084 |
| | | | | 180/68.1 |
| 2014/0151139 | A1* | 6/2014 | Rizzon | B60K 11/08 |
| | | | | 180/68.1 |
| 2017/0008387 | A1* | 1/2017 | Vincze | B60K 11/08 |
| 2019/0233026 | A1* | 8/2019 | Nakamura | B62D 25/24 |

* cited by examiner

UTILITY VEHICLE

BACKGROUND OF THE INVENTION

Field of the Invention

The present invention relates to a utility vehicle.

Description of Related Art

Utility vehicles are known as four-wheeled automobiles that can travel on rough terrain. There is a type of utility vehicle in which traveling wind is taken into the inside of the vehicle during traveling and the traveling wind that is taken in is used for cooling a radiator or the like. U.S. Pat. No. 5,901,786 discloses a vehicle of a type in which traveling wind is taken into the inside of a passenger car when traveling.

Further, in order to efficiently take the traveling wind into a vehicle, there may be a case where an opening is provided at a position facing the front of the vehicle, a passage formed from the opening toward the rear side of the vehicle is provided, and a channel wall for allowing air to pass through is provided so as to surround the outside of the passage over the entire circumference when viewed from the front of the vehicle. However, in a case where the channel wall for guiding the traveling wind is provided as described above, the lower part of the passage is also surrounded by the channel wall. For this reason, there is possibility that muddy water and earth and sand that enters the inside of the passage are accumulated inside the vehicle, the muddy water and earth and sand cannot be discharged to the outside by gravity, and the traveling wind cannot be efficiently taken in due to the muddy water and earth and sand accumulated inside the vehicle.

In particular, utility vehicles often travel on rough terrain, and, in such a case, a large amount of muddy water and earth and sand may enter the inside of the vehicle. In that case, there is possibility that the muddy water and earth and sand that enters the inside of the vehicle blocks the traveling wind, which reduces the efficiency of taking in the traveling wind.

SUMMARY OF THE INVENTION

It is an object of the present invention to provide a utility vehicle that can efficiently take in the traveling wind into the vehicle and discharge muddy water and earth and sand that enters a passage for taking in the traveling wind to the outside of the vehicle.

According to an aspect of the present invention, there is provided a utility vehicle, including a driving source, a vehicle body equipped with the driving source, an opening formed on the vehicle body, the opening through which traveling wind can be taken into the vehicle body when the vehicle body travels by driving of the driving source, a radiator capable of cooling a coolant for cooling the driving source by exchanging heat with traveling wind taken in from the opening, a passage that is provided between the opening and the radiator and guides the traveling wind taken in from the opening to the radiator, and a discharge mechanism that performs discharge operation to discharge foreign matter to outside when the foreign matter enters the inside of the passage together with the traveling wind.

According to the configuration, when foreign matter, such as muddy water and earth and sand, enters the inside of the passage between the opening and the radiator together with the traveling wind, the foreign matter can be discharged to the outside by the discharge mechanism, so that accumulation of foreign matter inside the passage can be suppressed. Therefore, foreign matter accumulated inside the passage can be suppressed from blocking the traveling wind that is taken in, and reduction in the efficiency of taking in the traveling wind can be suppressed.

The above object, other objects, features, and advantages of the present invention will be clarified by detailed description of a preferred embodiment described below with reference to the accompanying drawings.

DETAILED DESCRIPTION OF PREFERRED EMBODIMENTS

Hereinafter, embodiments according to the present invention will be described with reference to the drawings.

First Embodiment

Figure 1:
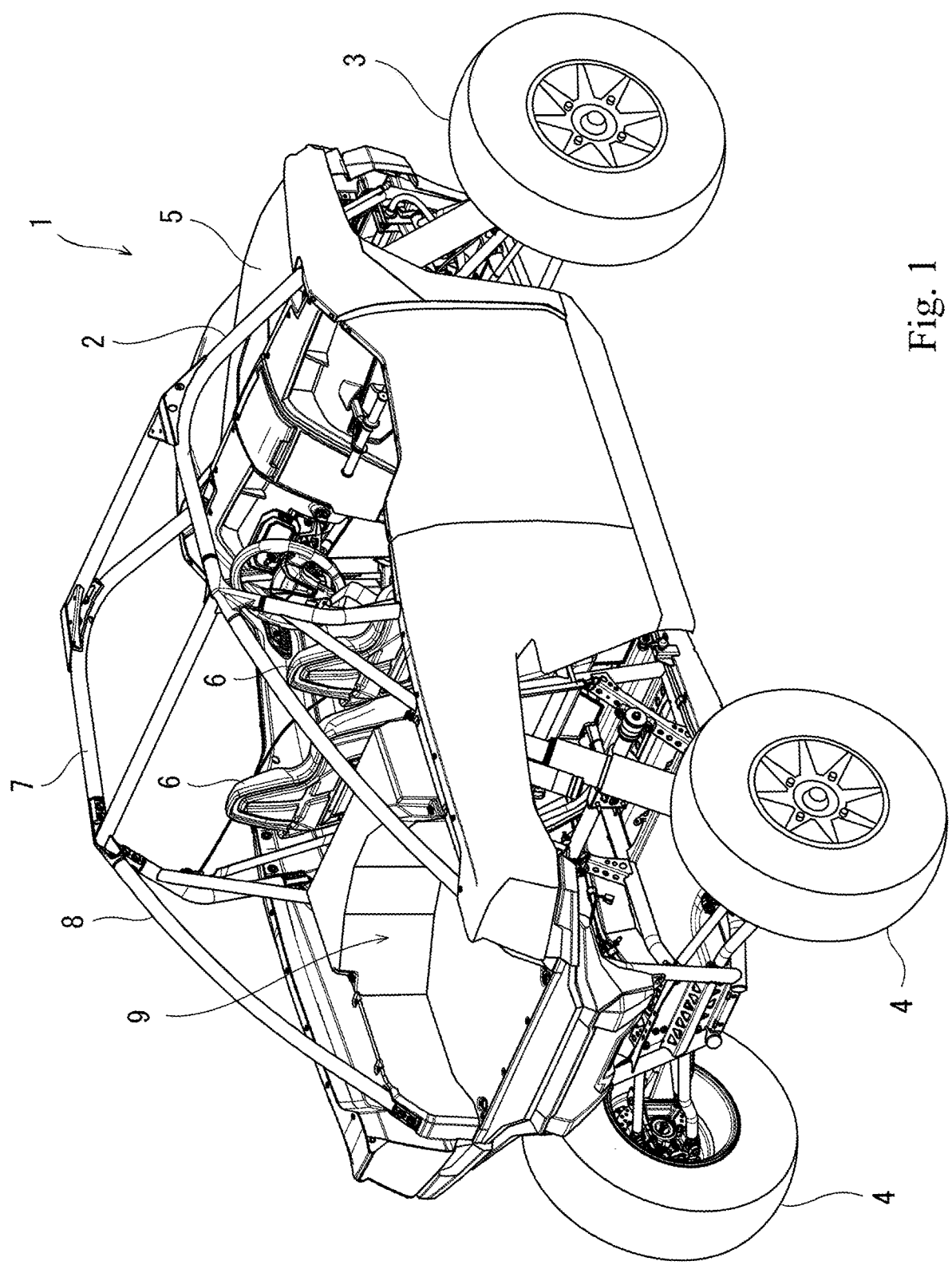
FIG. 1 is a perspective view of a utility vehicle according to a first embodiment.

FIG. 1 is a perspective view of a utility vehicle 1 according to a first embodiment. As shown in FIG. 1, the utility vehicle 1 includes a pair of left and right front wheels 3 supported on a front part of a vehicle body frame 2 and a pair of left and right rear wheels 4 supported on a rear part of the vehicle body frame 2. Space between the left and right front wheels 3 is covered from above with a hood 5 made from resin. A pair of occupant seats 6 (a driver's seat and a passenger seat) are arranged side by side near the center in a front-rear direction of the vehicle body frame 2 on the rear side of the hood 5.

The vehicle body frame 2 includes a cabin frame portion 7, a pair of left and right rear gusset frame portions 8, and the like. The vehicle body frame 2 is a pipe frame formed by connecting a plurality of pipe members to each other. The cabin frame portion 7 is formed so as to surround a vehicle interior in which the occupant seat 6 is installed.

Note that FIG. 1 does not illustrate a roof, a window, a windshield, and the like for the sake of explanation. However, in the present embodiment, the roof, the window, the windshield and the like can be disposed on the utility vehicle 1 so as to cover the vehicle interior. A cargo carrier 9 that forms loading space of a recessed shape is provided behind the occupant seat 6.

Below the cargo carrier 9, an engine (not shown) and a continuously variable transmission are mounted. The engine generates rotational power for driving a driving wheel. In a case where the utility vehicle 1 is two-wheel drive, the front wheel 3 or the rear wheel 4 is a driving wheel. In a case where the utility vehicle 1 is four-wheel drive, the front wheel 3 and the rear wheel 4 are driving wheels.

Figure 2:
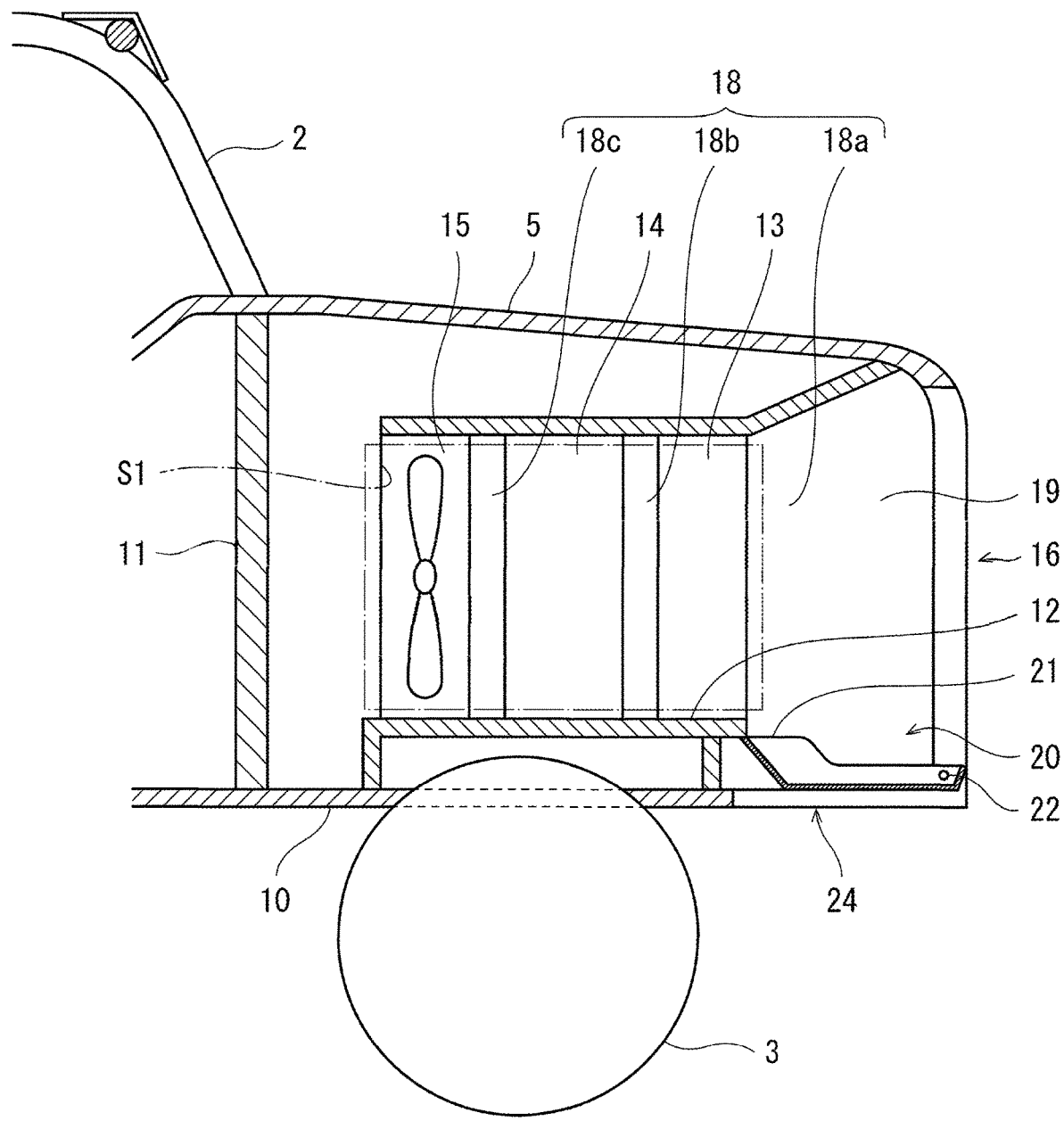
FIG. 2 is a cross-sectional view of a front portion of the utility vehicle shown in FIG. 1.

FIG. 2 shows a cross-sectional view of a front portion of the utility vehicle 1. FIG. 2 is a cross-sectional view of the utility vehicle 1 as viewed along a plane orthogonal to an axle between a pair of the left and right front wheels 3 or an axle between a pair of the left and right rear wheels 4. FIG. 2 shows an internal structure of a front part of the vehicle covered with the hood 5.

The utility vehicle 1 includes a bottom cover 10. The bottom cover 10 constitutes a lower surface of the vehicle. Further, the utility vehicle 1 also includes a bulkhead 11 disposed between an area covered with the hood 5 and the vehicle interior. A table 12 is disposed on an upper surface of the bottom cover 10.

The utility vehicle 1 includes an air conditioning mechanism that air-conditions an inside of the vehicle interior. By operating the air conditioning mechanism, a temperature inside the vehicle interior can be adjusted. Since the utility vehicle 1 is provided with an air conditioning mechanism, the vehicle interior is preferably closed tightly so that an air conditioning function acts efficiently inside the vehicle interior when the air conditioning mechanism is activated. In the present embodiment, a roof, a window, a windshield, and the like can be arranged on the utility vehicle 1 so that the vehicle interior is tightly closed.

The hood 5 has an opening 16 at a position in the front of the utility vehicle 1. Since the hood 5 has the opening 16, the utility vehicle 1 is configured to be able to take the traveling wind into the inside through the opening 16 when traveling.

The air conditioning mechanism includes a condenser 13 that can condense a refrigerant by exchanging heat between the refrigerant and the traveling wind taken in from the opening 16. The condenser 13 is disposed in an area covered with the hood 5, and the condenser 13 is installed on the table 12 in the present embodiment.

The utility vehicle 1 includes a radiator 14 that can cool a coolant in the engine by exchanging heat with the traveling wind taken in from the opening 16. The radiator 14 is disposed in an area covered with the hood 5, and, in the present embodiment, the radiator 14 is installed on the table 12 at a position behind the condenser 13.

Further, the utility vehicle 1 includes a fan 15 that can take in a larger amount of the traveling wind from the opening 16 by rotating. The fan 15 is disposed in an area covered with the hood 5, and, in the present embodiment, the fan 15 is installed on the table 12 at a position behind the radiator 14.

In the present embodiment, the condenser 13 is disposed at the foremost position in a traveling direction of the utility vehicle 1, the radiator 14 is disposed behind the condenser 13, and the fan 15 is disposed behind the radiator 14. That is, the condenser 13, the radiator 14, and the fan 15 are arranged in this order from the front to the rear in the traveling direction of the utility vehicle 1. In the present embodiment, space in which the condenser 13, the radiator 14, and the fan 15 are arranged is referred to as blowing space S1.

A passage 18 is formed in an area passing from the opening 16 in the space below the hood 5 toward the blowing space S1 and passing through the blowing space S1. In the present embodiment, the passage 18 includes a condenser passage 18a that guides the traveling wind taken from the opening 16 to the condenser 13. Further, in the present embodiment, the passage 18 includes a radiator passage 18b that is provided between the opening 16 and the radiator 14 and guides the traveling wind taken in from the opening 16 to the radiator 14. Further, in the present embodiment, the passage 18 includes a fan passage 18c that is provided between the opening 16 and the fan 15 and takes in the traveling wind from the opening 16 toward the fan 15 when the fan 15 rotates.

A shroud 19 is provided around the passage 18 so as to surround the passage 18. In the present embodiment, the shroud 19 is configured to surround the upper side and both sides of the passage 18. Below the passage 18, there is provided a discharge mechanism 20 that surrounds the passage 18 like the shroud 19 and performs discharge operation for discharging foreign matter to the outside when the foreign matter enters the passage 18. In the present embodiment, the discharge mechanism 20 is disposed at a position facing an area common to a condenser passage 18a, a radiator passage 18b, and a fan passage 18c in the passage 18. The discharge mechanism 20 has a tray 21. The tray 21 is configured to be able to contain foreign matter, such as muddy water and earth and sand, that enters the opening 16 together with the traveling wind.

Further, the discharge mechanism 20 has a rotation shaft 22. The tray 21 is attached to the utility vehicle 1 so as to be rotatable about the rotation shaft 22. The rotation shaft 22 extends in the same direction as the axle between a pair of the left and right front wheels 3 or the axle between a pair of the left and right rear wheels 4.

Further, the bottom cover 10 is also provided with a tray passage 24 through which the rotating tray 21 passes, so that the bottom cover 10 does not interfere with the rotation of the tray 21 when the tray 21 rotates about the rotation shaft 22. The tray passage 24 is formed so as to penetrate the bottom cover 10 in a thickness direction of the bottom cover 10.

Figure 3:
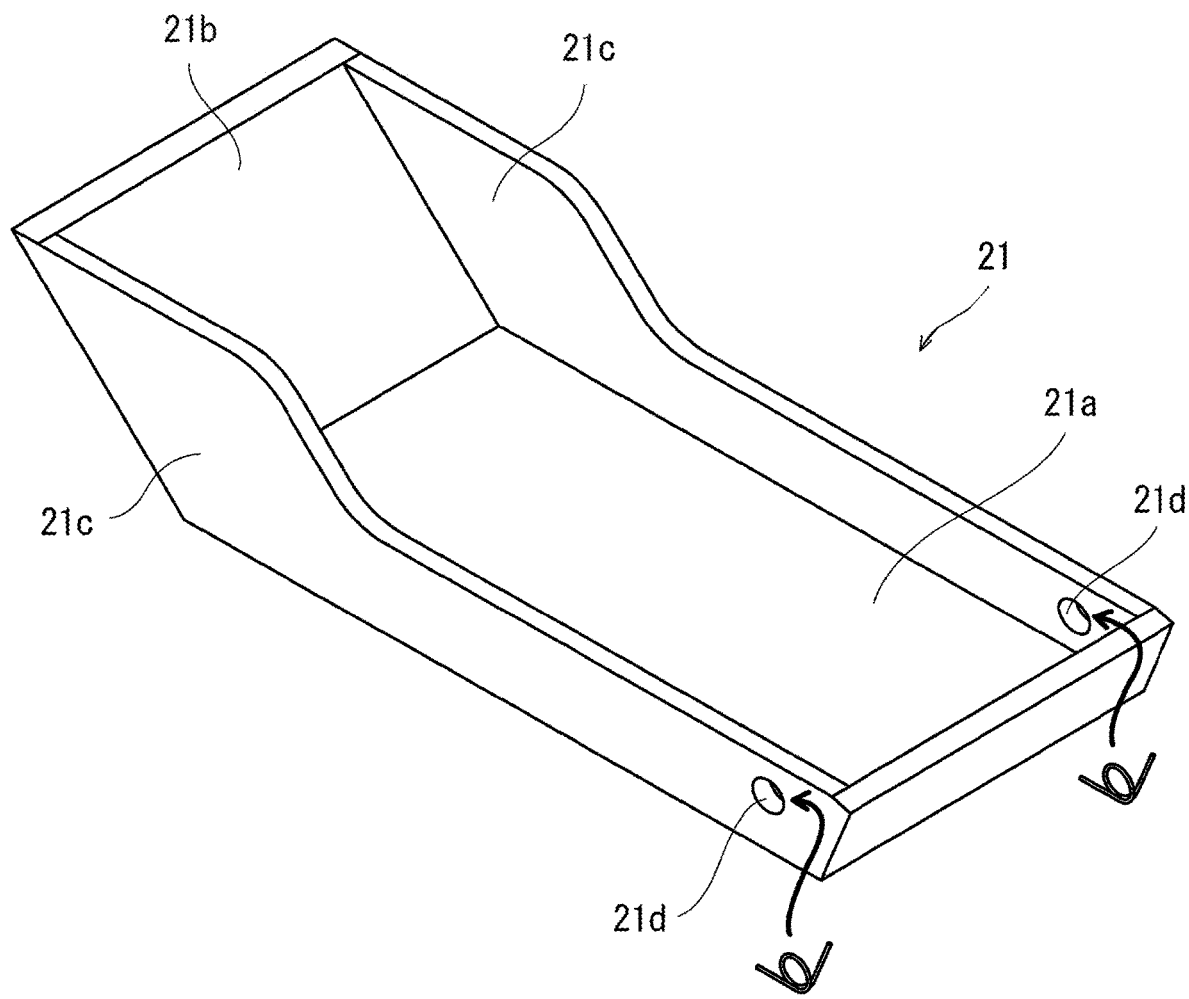
FIG. 3 is a perspective view of a tray of a discharge mechanism shown in FIG. 2.

FIG. 3 shows a perspective view of the tray 21. The tray 21 is open at the top, and is configured to contain the foreign matter that enters an air inlet 17 together with the traveling wind. In the present embodiment, the tray 21 has a bottom surface 21a for receiving the foreign matter that drops. Further, the tray 21 has a rear surface 21b in a rear part of the utility vehicle 1 in the traveling direction. The rear surface 21b is disposed on the side of the bottom surface 21a so as to surround the foreign matter in a rear part in the traveling direction of the bottom surface 21a. The rear surface 21b is inclined in such a manner that the upper side of the rear surface 21b is closer to the rear side.

Further, the tray 21 has a side surface 21c on the side of the bottom surface 21a so as to surround the foreign matter on the side. The side surfaces 21c are provided on both the left and right sides of the bottom surface 21a. The side surface 21c has a hole 21d at a position in the front part in the traveling direction of the utility vehicle 1. The holes 21d are provided on the side surfaces 21c on both sides. The tray 21 is configured to be rotatable with respect to the utility vehicle 1 with the rotation shaft 22 extending from the utility vehicle 1 inserted into the hole 21d.

A spring 25 is provided between the side surface 21c and the rotation shaft 22. In the present embodiment, a torsion spring is used as the spring 25. For example, the spring 25 is disposed between the side surface 21c and the rotation shaft 22 so that one end of the spring 25 is fixed to the rotation shaft 22 and the other end of the spring 25 is in contact with the side surface 21c.

In a state where nothing is contained in the tray 21, the side surface 21c is biased by the spring 25 so that the side surface 21c does not rotate and the posture shown in FIG. 2 is maintained. Since the side surface 21c is biased by the spring 25, the tray 21 is maintained in the posture shown in FIG. 2 when nothing is contained inside the tray 21.

Further, the tray 21 has a front surface 21e in the front part in the traveling direction of the utility vehicle 1. The front surface 21e is provided in the front part of the bottom surface 21a so as to surround the foreign matter that drops on the bottom surface 21a in the front part of the traveling direction. The front surface 21e is inclined in such a manner that the upper side of the front surface 21e is closer to the front side.

Figure 4A:
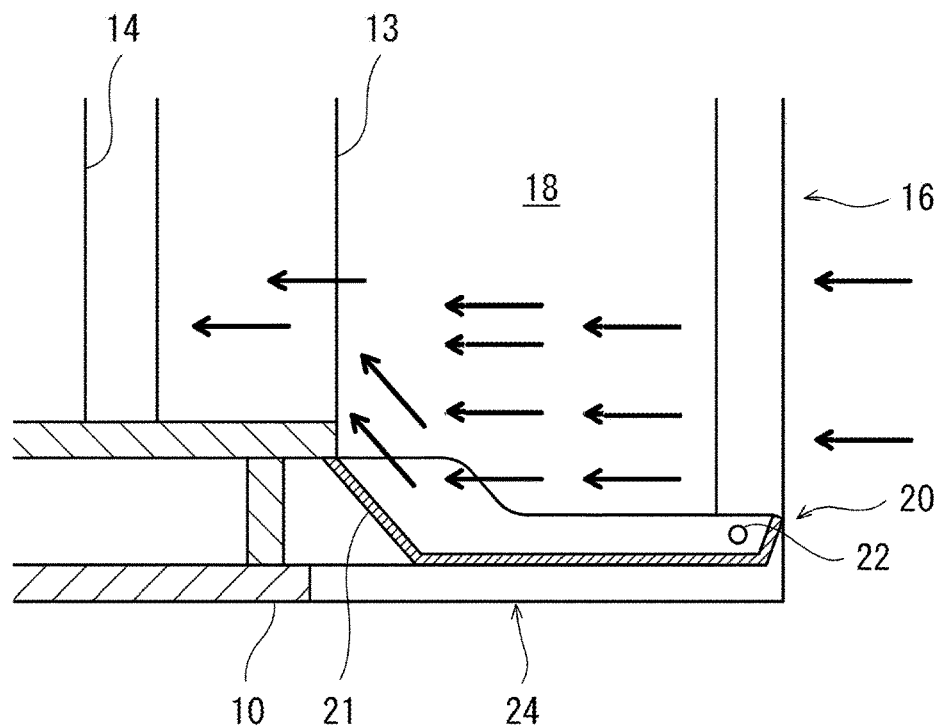
FIG. 4A is a cross-sectional view of the vicinity of the discharge mechanism in the absence of foreign matter.
Figure 4B:
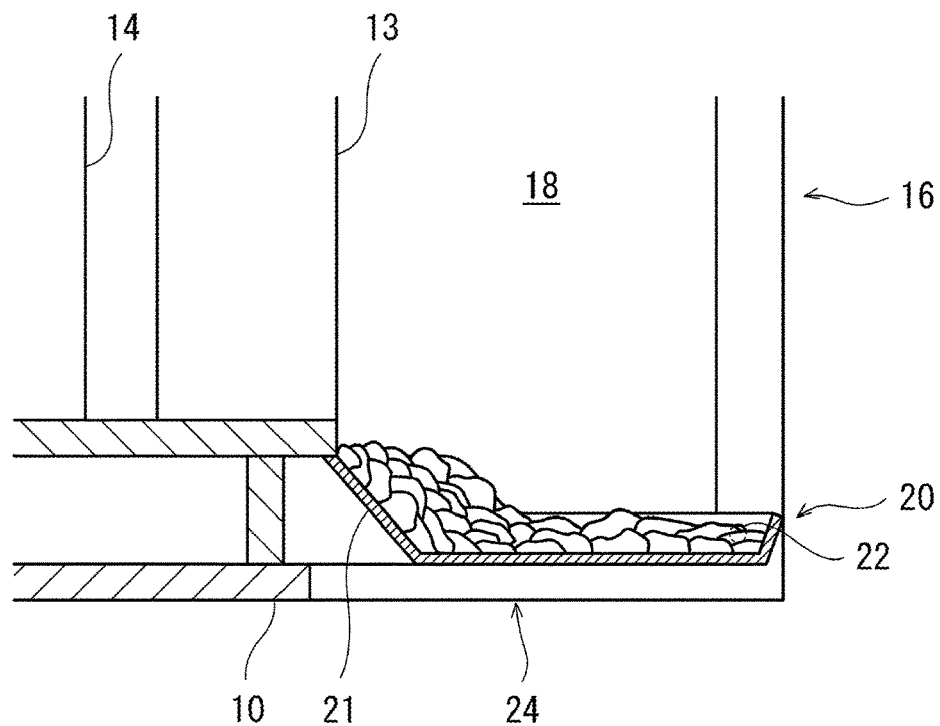
FIG. 4B is a cross-sectional view of the vicinity of the discharge mechanism in a state of containing the foreign matter.
Figure 4C:
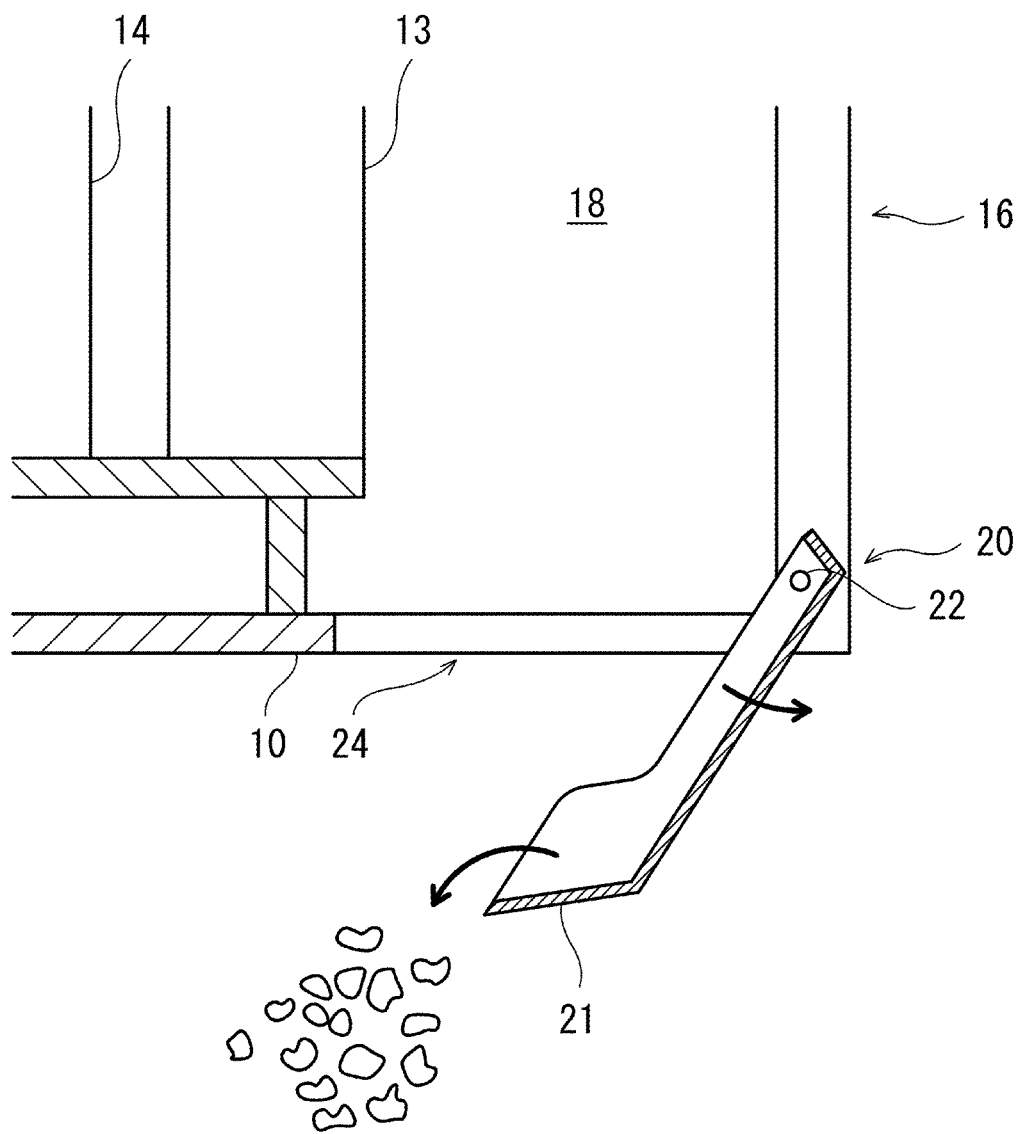
FIG. 4C is a cross-sectional view of the vicinity of the discharge mechanism in a state of discharging the foreign matter.

FIGS. 4A, 4B, and 4C are enlarged cross-sectional views around the discharge mechanism 20. FIG. 4A shows a cross-sectional view of the vicinity of the discharge mechanism 20 in a state where no foreign matter is contained in the tray 21. The tray 21 is biased by a spring so as to maintain the posture shown in FIG. 4A in a state where no foreign matter is contained.

When the utility vehicle 1 travels forward in the traveling direction, the traveling wind enters the passage 18 from the opening 16 as the utility vehicle 1 travels. The tray 21 can close the lower part of the passage 18 while the posture of FIG. 4A is maintained. Therefore, in the state shown in FIG. 4A, the discharge mechanism 20 is in a closed state in which the lower part of the passage 18 is closed. Since the lower part of the passage 18 is closed by the tray 21, four sides; the upper part, side parts, and lower part, of the passage 18 are blocked by the shroud 19 and the tray 21. Therefore, the traveling wind taken into the inside of the passage 18 from the opening 16 is efficiently sent to the blowing space S1. That is, the tray 21 regulates the traveling wind in the lower part of the passage 18 so that the traveling wind flows toward the condenser 13, the radiator 14, and the fan 15 in a state where no foreign matter is contained.

Since the utility vehicle 1 often travels on rough terrain, when the traveling wind enters the passage 18 from the opening 16, foreign matter, such as muddy water and earth and sand, may enter the passage 18 through the opening 16 together with the traveling wind. FIG. 4B shows a cross-sectional view of the vicinity of the discharge mechanism 20 in a state in which foreign matter enters the passage 18 through the opening 16 and the foreign matter is contained in the tray 21. As shown in FIG. 4B, when the foreign matter is contained in the tray 21, the combined weight of the tray 21 and the foreign matter increases. When the gravity acting on the tray 21 due to the combined weight of the tray 21 and the foreign matter exceeds the biasing force of the spring 25 disposed between the side surface 21c and the rotation shaft 22, the tray 21 rotates about the rotation shaft 22.

FIG. 4C shows a cross-sectional view of the vicinity of the discharge mechanism 20 when the tray 21 rotates about the rotation shaft 22. When the tray 21 rotates, the foreign matter contained in the tray 21 is dropped below the bottom cover 10. In the state shown in FIG. 4C, the discharge mechanism 20 is in an open state in which the lower part of the passage 18 is opened. In this manner, the foreign matter contained in the tray 21 is discharged to the outside. When the foreign matter is discharged to the outside, the tray 21 is in a state where no foreign matter is contained. Therefore, the tray 21 returns to the position shown in FIG. 4A by the biasing force of the spring disposed between the side surface 21c and the rotation shaft 22. When the tray 21 returns to the position of FIG. 4A, the tray 21 again closes the lower portion of the passage 18 and regulates the traveling wind.

In the present embodiment, by rotating the tray 21, the foreign matter contained in the tray 21 can be discharged to the outside. In this manner, the discharge mechanism 20 can change the position of the tray 21 between an open state in which the tray 21 is opened when foreign matter is discharged and a closed state when the foreign matter is not discharged. In the present embodiment, the tray 21 is disposed at a position facing an area common to the condenser passage 18a, the radiator passage 18b, and the fan passage 18c in the passage 18. Therefore, the tray 21 is disposed at a position where the foreign matter that enters the radiator passage 18b between the radiator 14 and the opening 16 in the passage 18 can be contained. When foreign matter, such as muddy water and earth and sand, enters the inside of the radiator passage 18b together with the traveling wind, the foreign matter can be discharged to the outside by the discharge mechanism 20, so that accumulation of foreign matter inside the radiator passage 18b can be suppressed. Therefore, foreign matter accumulated inside the radiator passage 18b can be suppressed from blocking the traveling wind that is taken in, and reduction in the efficiency of taking the traveling wind into the radiator 14 can be suppressed. Since the traveling wind can be efficiently taken into the radiator 14, the coolant can be efficiently cooled by the radiator 14. Therefore, the engine is sufficiently cooled with the coolant.

Further, in the present embodiment, the tray 21 is disposed at a position facing an area common to the condenser passage 18a, the radiator passage 18b, and the fan passage 18c in the passage 18, so that discharge operation for discharging foreign matter to the outside can be performed when the foreign matter enters the inside of the condenser passage 18a together with the traveling wind. When foreign matter, such as muddy water and earth and sand, enters the inside of the condenser passage 18a together with the traveling wind, the foreign matter can be discharged to the outside by the discharge mechanism 20, so that accumulation of the foreign matter in the inside of the condenser passage 18a can also be suppressed. Therefore, foreign matter accumulated inside the condenser passage 18a can be suppressed from blocking the traveling wind that is taken in, and reduction in the efficiency of taking the traveling wind into the condenser 13 can be suppressed. Since the traveling wind can be efficiently taken into the condenser 13, reduction in the efficiency of condensation of the refrigerant in the condenser 13 can be suppressed. In this manner, the air conditioning mechanism can perform air conditioning in an excellent manner.

Further, in the present embodiment, the tray 21 is disposed at a position facing an area common to the condenser passage 18a, the radiator passage 18b, and the fan passage 18c in the passage 18, so that discharge operation for discharging foreign matter to the outside can be performed when the foreign matter enters the inside of the fan passage 18c together with the traveling wind. When foreign matter, such as muddy water and earth and sand, enters the inside of the fan passage 18c together with the traveling wind, the foreign matter can be discharged to the outside by the discharge mechanism 20, so that accumulation of the foreign matter in the inside of the fan passage 18c can also be suppressed. Therefore, foreign matter accumulated inside the fan passage 18c can be suppressed from blocking the traveling wind that is taken in, and reduction in an amount of wind taken in by the fan 15 can be suppressed.

Further, in the present embodiment, the tray 21 is biased by the spring 25, and the discharge mechanism 20 is configured to perform the discharge operation when a predetermined amount or more of foreign matter enters the passage 18. Since the discharge mechanism 20 performs discharge operation when a predetermined amount or more of foreign matter enters the passage 18, a state in which only foreign matter whose amount is smaller than the predetermined amount enters the inside of the passage 18 is maintained. For this reason, by setting a predetermined amount of foreign matter so that the foreign matter does not block the traveling wind, the foreign matter can be reliably suppressed from blocking the traveling wind.

Further, in the present embodiment, when foreign matter having a predetermined weight or more is placed on the tray 21 that is biased to the position of the closed state, and the gravity greater than or equal to the biasing force by the spring 25 acts on the tray 21, the tray 21 moves to the position of the open state, and the discharge mechanism 20 performs the discharge operation. Therefore, when foreign matter having a predetermined weight or more enters the passage 18, the foreign matter is automatically discharged to the outside through the discharge operation. Accordingly, the discharge mechanism 20 that can discharge foreign matter accumulated inside the passage 18 to the outside can be formed with a simple configuration.

Further, in the present embodiment, since the condenser 13, the radiator 14, and the fan 15 are arranged in this order from the front to the rear in the vehicle body of the utility vehicle 1, the traveling wind taken in from the opening 16 first passes through the condenser 13, next passes through the radiator 14, and then passes through the fan 15. In general, among a condenser, a radiator, and a fan, the condenser requires the traveling wind the most, and then the radiator requires the traveling wind next. When the traveling wind is taken in, heat is first exchanged in the condenser 13. Accordingly, a large amount of heat exchange in the condenser 13 is ensured and air conditioning can be performed in an excellent manner. Further, since the coolant is then cooled by the radiator 14, the coolant can be sufficiently cooled by the traveling wind, and the function of cooling the coolant by the radiator 14 can be sufficiently ensured.

Note that, the above embodiment describes the mode in which the tray 21 is disposed at a position facing an area common to the condenser passage 18a, the radiator passage 18b, and the fan passage 18c in the passage 18. However, the present invention is not limited to the above embodiment. The position at which the tray 21 is disposed does not need to be a position facing the area common to the condenser passage 18a, the radiator passage 18b, and the fan passage 18c. In a case where foreign matter is required to be discharged only at the radiator passage 18b, the tray 21 may be disposed at a position facing only the radiator passage 18b and not facing the condenser passage 18a and the fan passage 18c. The tray 21 does not need to be formed at a position facing the condenser passage 18a and the fan passage 18c as long as the tray 21 faces at least the radiator passage 18b and foreign matter can be discharged at the radiator passage 18b. Further, the tray 21 may be disposed at a position facing the condenser passage 18a and the radiator passage 18b and not facing the fan passage 18c. Further, the tray 21 may be disposed at a position facing the radiator passage 18b and the fan passage 18c and not facing the condenser passage 18a.

Further, the above embodiment describes the mode in which the utility vehicle 1 has the air conditioning mechanism, and the air conditioning mechanism has the condenser 13 that condenses the refrigerant. However, the present invention is not limited to the above embodiment, and the utility vehicle may be of a type that does not have an air conditioning mechanism. In that case, the utility vehicle does not have a condenser. In such a case, the discharge mechanism is preferably disposed at a position facing a passage between the opening and the radiator and a passage between the opening and the fan. Further, the utility vehicle may be of a type that does not have a condenser or a fan. In that case, the discharge mechanism is preferably disposed at a position facing a passage between the opening and the radiator.

Second Embodiment

Next, the discharge mechanism 20 according to a second embodiment of the present invention will be described. Note that, description of a part configured in the same manner as the first embodiment will be omitted, and only a different part will be described.

In the first embodiment, a torsion spring is used as the spring for biasing the rotation of the tray 21. On the other hand, in the second embodiment, an extension spring is used as a spring for biasing the rotation of the tray.

Figure 5A:
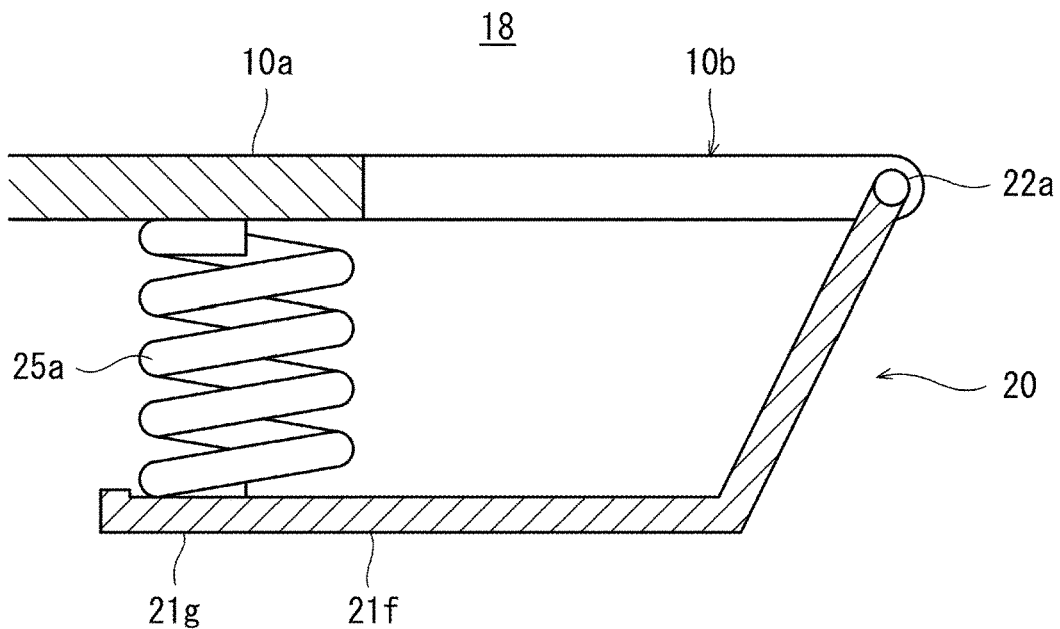
FIG. 5A is a cross-sectional view of the vicinity of the discharge mechanism in the absence of foreign matter of the utility vehicle according to a second embodiment.
Figure 5B:
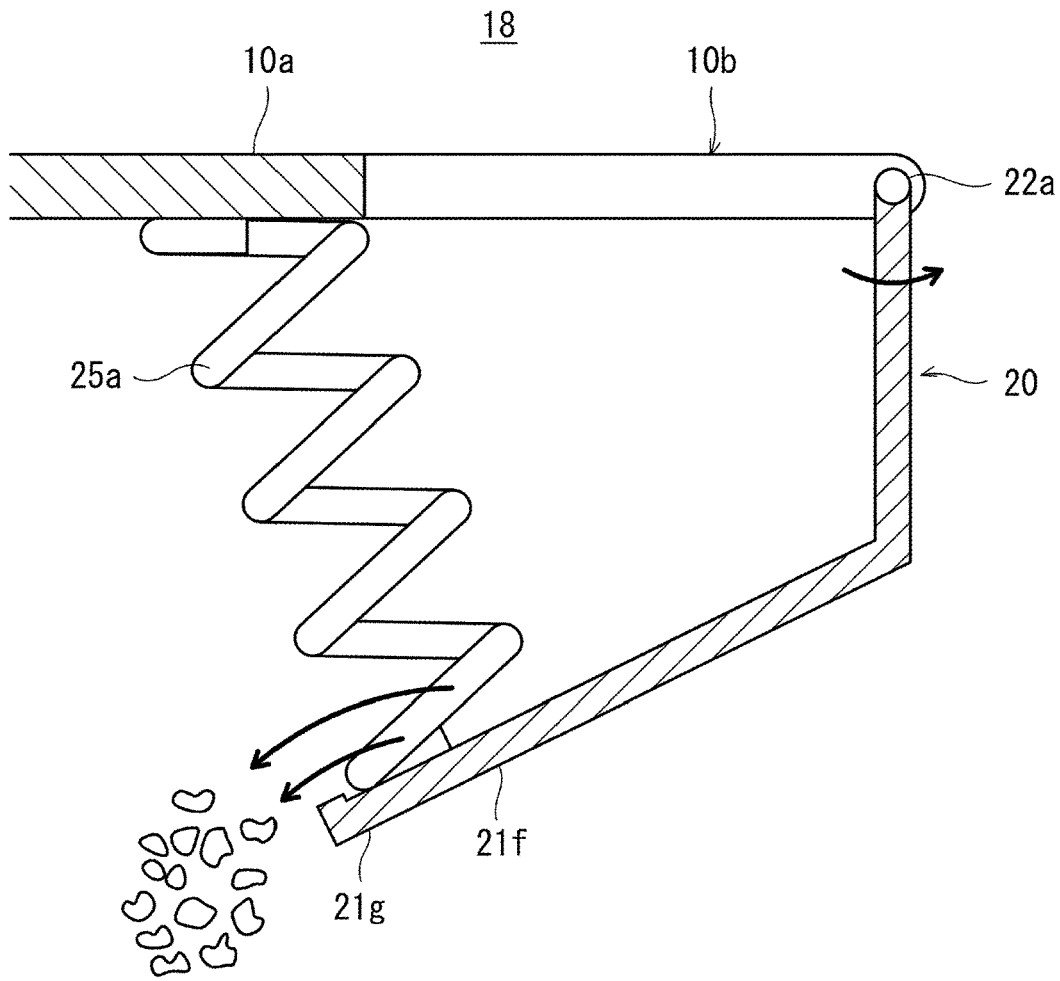
FIG. 5B is a cross-sectional view of the vicinity of the discharge mechanism in a state of discharging the foreign matter.

With reference to FIGS. 5A and 5B, the discharge mechanism 20 that biases the rotation of a tray 21f using an extension spring 25a will be described. The tray 21f is disposed below a bottom cover 10a. On the bottom cover 10a, a foreign matter passage 10b through which foreign matter passes so that the tray 21f contains the foreign matter is formed. When foreign matter enters the passage 18, the foreign matter is contained in the tray 21f after passing through the foreign matter passage 10b. The tray 21f is configured to be rotatable about a rotation shaft 22a. The tray 21f is connected to the bottom cover 10a with the extension spring 25a interposed between them. In the present embodiment, the extension spring 25a is connected to the tray 21f at a rear portion 21g in the traveling direction of the tray 21f.

FIG. 5A shows a cross-sectional view of the vicinity of the discharge mechanism 20 in a state where no foreign matter is contained in the tray 21f. The extension spring 25a biases a portion 21g connected to the extension spring 25a of the tray 21f so as to move the portion 21g toward the bottom cover 10a. For this reason, in a state where no foreign matter is contained in the tray 21f, the position of the tray 21f is maintained at the position shown in FIG. 5A.

The foreign matter is contained in the tray 21f, and the gravity due to the combined weight of the tray 21f and the foreign matter acts on the tray 21f, and, when the gravity exceeds the biasing force, the extension spring 25a extends, and the tray 21f rotates around the rotation shaft 22a as shown in FIG. 5B.

FIG. 5B shows a cross-sectional view of the vicinity of the discharge mechanism 20 when the tray 21f rotationally moves about the rotation shaft 22a. When the tray 21f rotationally moves, the portion 21g of the tray 21f is lowered. For this reason, the foreign matter contained in the tray 21f falls from the tray 21f, and the foreign matter is discharged to the outside. When the foreign matter contained in the tray 21f is discharged to the outside, the tray 21f becomes in a state in which no foreign matter is contained in the inside, and the tray 21f returns to the position shown in FIG. 5A.

Third Embodiment

Next, the discharge mechanism 20 according to a third embodiment of the present invention will be described. Note that, description of a part configured in the same manner as the first embodiment and the second embodiment will be omitted, and only a different part will be described. The third embodiment is different from the first embodiment and the second embodiment in that the discharge mechanism is configured to be able to discharge foreign matter by moving the tray supporting the foreign matter by a motor when the foreign matter is supported on the tray.

Figure 6A:
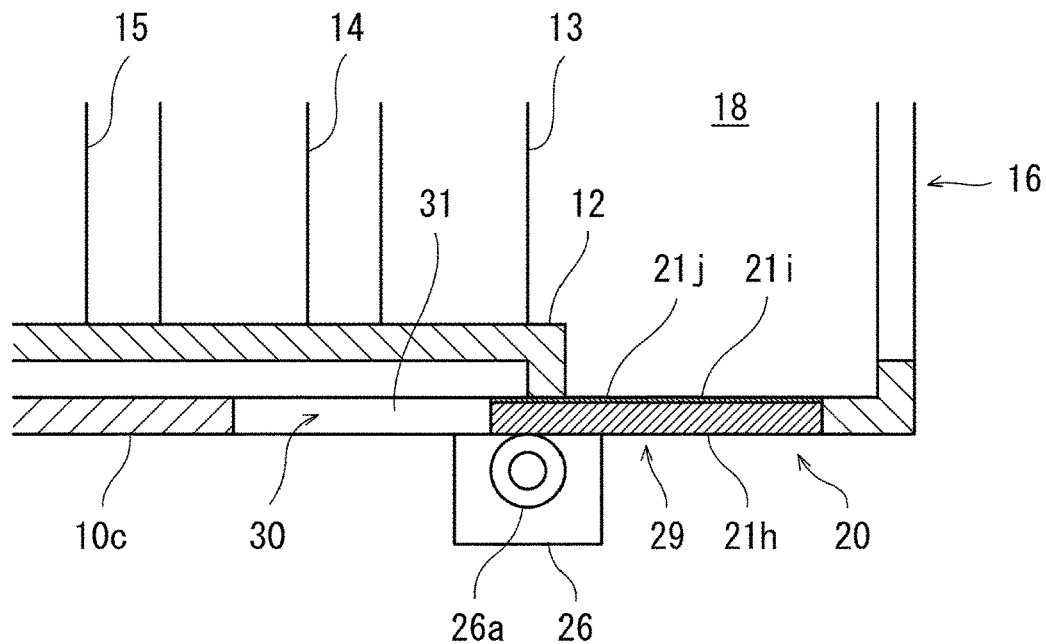
FIG. 6A is a cross-sectional view of the vicinity of the discharge mechanism in the absence of foreign matter of the utility vehicle according to a third embodiment.
Figure 6B:
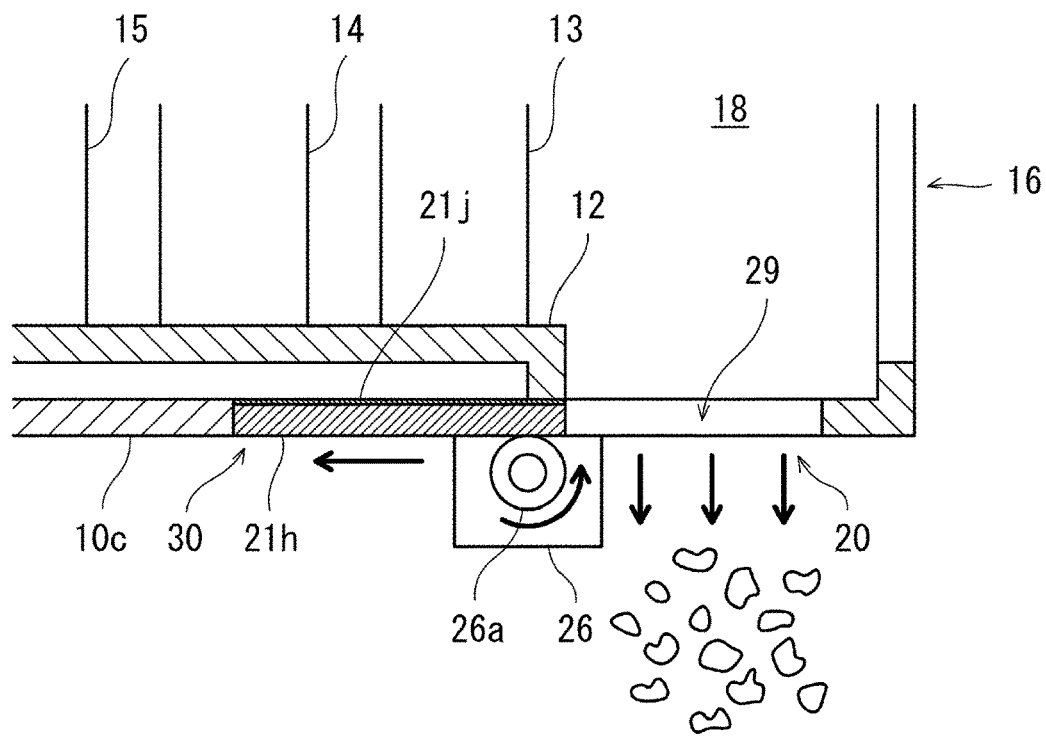
FIG. 6B is a cross-sectional view of the vicinity of the discharge mechanism in a state of discharging the foreign matter.

FIGS. 6A and 6B are cross-sectional views of the vicinity of the discharge mechanism 20 of the third embodiment. FIG. 6A shows a cross-sectional view of the vicinity of the discharge mechanism 20 in a state where no foreign matter is on the tray, and FIG. 6B shows a cross-sectional view of the vicinity of the discharge mechanism 20 in a state where foreign matter is discharged by movement of the tray after the foreign matter is supported on the tray.

With reference to FIGS. 6A and 6B, description will be made on the discharge mechanism 20 that discharges foreign matter by movement of the tray when the foreign matter is supported on the tray. A tray 21h is disposed at a position at the same height as the bottom cover 10c so as to be movable back and forth in the traveling direction. A motor 26 is disposed at a position below the tray 21h. The motor 26 has a drive shaft 26a. In the present embodiment, the motor 26 is disposed in such a manner that the drive shaft 26a abuts on the tray 21h so that the drive of the drive shaft 26a can be transmitted to the tray 21h when the drive shaft 26a rotates. Further, in the present embodiment, the discharge mechanism 20 includes a sensor 21j.

In the present embodiment, the sensor 21j is a pressure sensor. The sensor 21j is configured such that the tray 21h moves when a detected pressure is a predetermined pressure or more. By detecting the pressure by the sensor 21j, whether or not the gravity acting on the tray 21h due to the weight of foreign matter supported on the tray 21h exceeds a predetermined degree can be detected. In this manner, whether or not an amount of foreign matter that enters the passage 18 through the opening 16 and is supported on the tray 21h exceeds a predetermined amount can be detected.

FIG. 6A shows a cross-sectional view of the vicinity of the discharge mechanism 20 in a state where no foreign matter is supported on the tray 21h. The tray 21h is disposed at a position facing the passage 18. In the state where no foreign matter is supported on the tray 21h shown in FIG. 6A, the tray 21h is disposed at a support position 29 where foreign matter can be supported. A storage position 30 at which the tray 21h can be stored is provided at a position adjacent to the position where the tray 21 is disposed.

In the present embodiment, a table 12 is provided above the bottom cover 10c, and the condenser 13, the radiator 14, and the fan 15 are disposed on a top surface of the table 12. A storage portion 31 capable of storing the tray 21h is provided below the table 12. The storage position 30 is a position where the tray 21h is stored in the storage portion 31.

In a state where the tray 21h is at the support position 29, the tray 21h closes the lower portion of the passage 18 and regulates the traveling wind. When the traveling wind enters the passage 18 from the opening 16, foreign matter enters the passage 18 through the opening 16 together with the traveling wind. In the present embodiment, foreign matter that enters the passage 18 is supported on the tray 21h.

When an amount of the foreign matter supported on the tray 21h is detected to be a predetermined amount or more, the tray 21h moves as shown in FIG. 6B by the rotation of the drive shaft 26a of the motor 26. In the present embodiment, since the sensor 21j is provided on the passage 18 side 21i of the tray 21h, the sensor 21j is configured to be able to detect whether or not an amount of the foreign matter supported on the tray 21h is a predetermined amount or more. When the sensor 21j detects that the amount of the foreign matter supported on the tray 21h is the predetermined amount or more, the tray 21h moves to the storage position 30 as shown in FIG. 6B.

As shown in FIG. 6B, when the tray 21h moves to the storage position 30, there is no support for the foreign matter at the support position 29, the foreign matter supported by the tray 21h falls, and the foreign matter is discharged to the outside by gravity. When the foreign matter supported on the tray 21h is discharged to the outside, the tray 21h becomes in a state of not supporting foreign matter, and the tray 21h returns to the support position 29 shown in FIG. 6A. When the tray 21h returns to the support position 29 in FIG. 6A, the tray 21h closes the lower portion of the passage 18 and regulates the traveling wind.

In the present embodiment, when the sensor 21j detects that an amount of foreign matter is a predetermined amount or more, the discharge mechanism 20 performs the discharge operation. Accordingly, whether or not an amount of foreign matter is a predetermined amount or more can be detected accurately. Therefore, an amount of foreign matter inside the passage 18 can be more reliably made smaller than a predetermined amount, and the foreign matter can be more reliably suppressed from blocking the traveling wind.

Further, in the present embodiment, when a pressure detected by the sensor 21j as a pressure sensor is a predetermined pressure or more, the discharge mechanism 20 performs the discharge operation. Accordingly, whether or not an amount of foreign matter per unit area is a predetermined amount or more can be detected accurately.

In the present embodiment, the tray 21h is configured to be movable by the drive of the motor 26, and, when the tray 21h is stored in the storage position 30, the foreign matter supported by the tray 21h is discharged to the outside by gravity. Therefore, the foreign matter is discharged to the outside by movement of the tray. Accordingly, the discharge mechanism that can discharge foreign matter accumulated inside the passage to the outside can be formed with a simple configuration.

Fourth Embodiment

Next, the discharge mechanism 20 according to a fourth embodiment of the present invention will be described. Note that, description of a part configured in the same manner as the first embodiment to the third embodiment will be omitted, and only a different part will be described. The fourth embodiment is different from the first embodiment to the third embodiment in that the discharge mechanism has an optical sensor having a light emitting unit and a light receiving unit, and the optical sensor is used to detect that an amount of foreign matter on the tray is a predetermined amount or more.

Figure 7A:
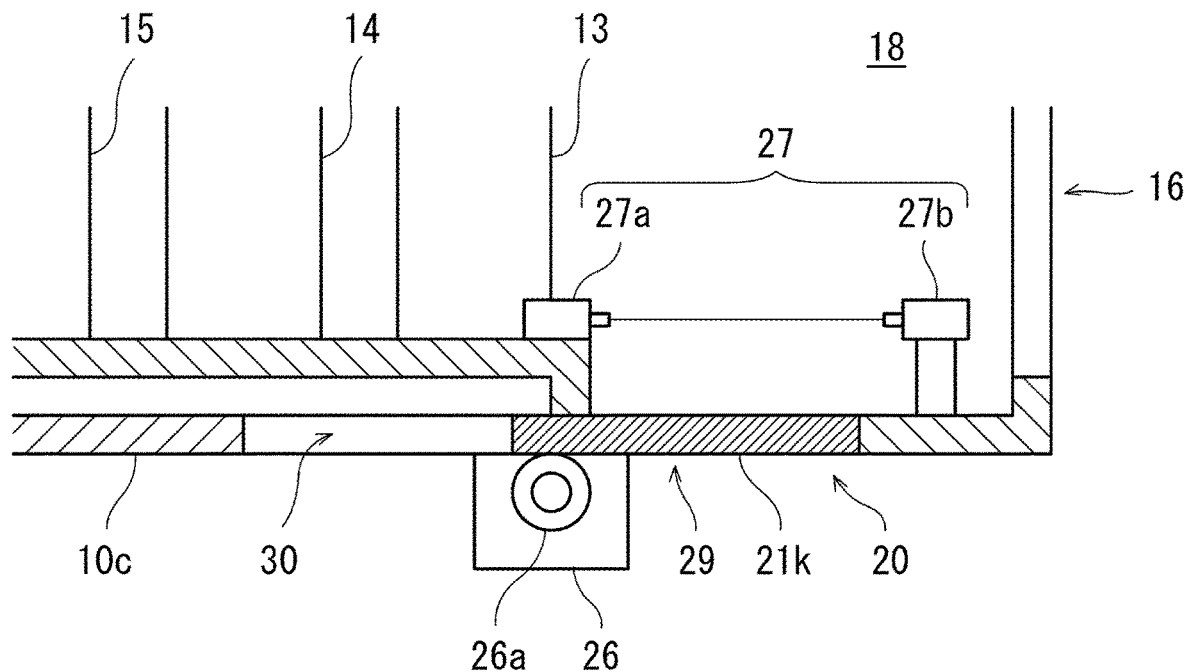
FIG. 7A is a cross-sectional view of the vicinity of the discharge mechanism in the absence of foreign matter of the utility vehicle according to a fourth embodiment.
Figure 7B:
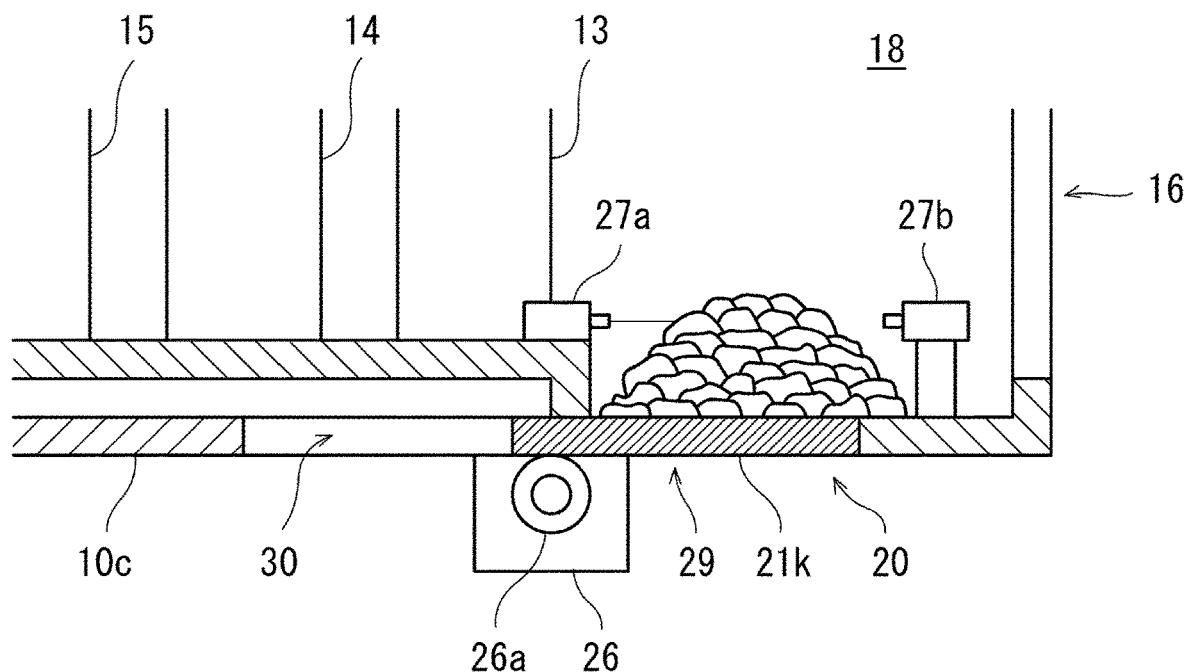
FIG. 7B is a cross-sectional view of the vicinity of the discharge mechanism in a state of containing the foreign matter.
Figure 7C:
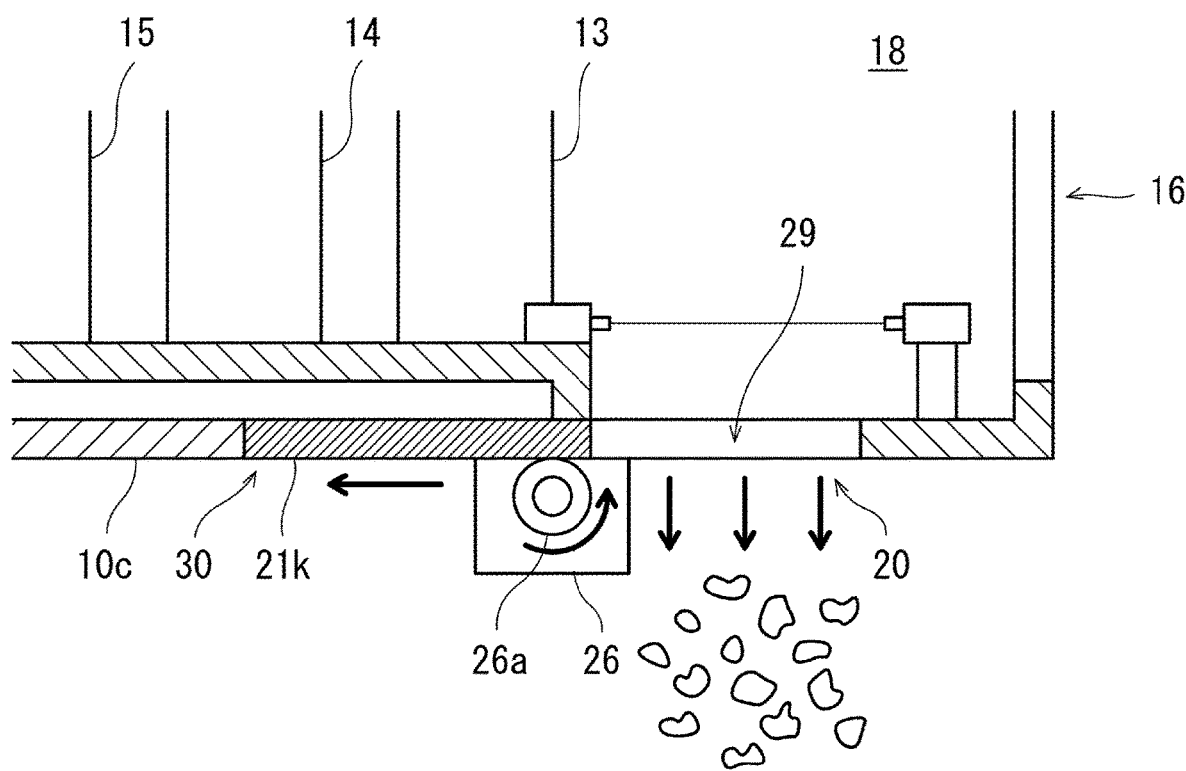
FIG. 7C is a cross-sectional view of the vicinity of the discharge mechanism in a state of discharging the foreign matter.

FIGS. 7A to 7C are cross-sectional views of the vicinity of the discharge mechanism 20 of the fourth embodiment. FIG. 7A shows a cross-sectional view of the vicinity of the discharge mechanism 20 in a state where no foreign matter is on the tray, FIG. 7B shows a cross-sectional view of the vicinity of the discharge mechanism 20 in a state where foreign matter is supported on the tray, and FIG. 7C shows a cross-sectional view of the vicinity of the discharge mechanism 20 in a state where the foreign matter is discharged by movement of the tray.

Referring to FIGS. 7A to 7C, description will be made on the discharge mechanism 20 that uses the optical sensor to detect whether or not foreign matter is supported, and discharges the foreign matter by movement of the tray when the optical sensor detects that the foreign matter is supported on the tray. A tray 21k is disposed at a position at the same height as the bottom cover 10c so as to be movable back and forth in the traveling direction. In the state where no foreign matter is supported on the tray 21k shown in FIG. 7A, the tray 21k is disposed at the support position 29 where foreign matter can be supported. The storage position 30 at which the tray 21k can be stored is provided at a position adjacent to the position where the tray 21k is disposed. The motor 26 is disposed at a position below the tray 21k. The motor 26 has the drive shaft 26a. In the present embodiment, the motor 26 is disposed in such a manner that the drive shaft 26a abuts on the tray 21k so that the drive of the drive shaft 26a can be transmitted to the tray 26k when the drive shaft 26a rotates.

In the present embodiment, the discharge mechanism 20 has an optical sensor 27 at a position closer to the passage 18 side than the bottom cover 10c. The optical sensor 27 includes a light emitting unit 27a and a light receiving unit 27b. The light emitting unit 27a and the light receiving unit 27b are configured so that light emitted from the light emitting unit 27a can be received by the light receiving unit 27b. The discharge mechanism 20 is configured to be able to detect reduction in an amount of light received by the light receiving unit 27b.

The tray 21k can move from the support position 29 in FIG. 7A to the storage position 30 in FIG. 7C or from the storage position 30 in FIG. 7C to the support position 29 in FIG. 7A according to the drive of the drive shaft 26a.

FIG. 7A shows a cross-sectional view of the vicinity of the discharge mechanism 20 in a state where no foreign matter is supported on the tray 21k. The tray 21k is disposed at the support position 29 facing the passage 18. In the state shown in FIG. 7A, the tray 21k closes the lower portion of the passage 18 and regulates the traveling wind. When the traveling wind enters the passage 18 from the opening 16, foreign matter enters the passage 18 through the opening 16 together with the traveling wind. In the present embodiment, foreign matter enters the passage 18 is supported on the tray 21k.

FIG. 7B shows a cross-sectional view of the vicinity of the discharge mechanism 20 in a state where foreign matter of a predetermined amount or more is supported on the tray 21k. Due to the foreign matter of a predetermined amount or more being supported on the tray 21k, the light emitted from the light emitting unit 27a is blocked by the foreign matter and does not reach the light receiving unit 27b. For this reason, the amount of light received by the light receiving unit 27b is reduced as compared with the state of FIG. 7A. The discharge mechanism 20 is configured to be able to detect reduction in the amount of light received by the light receiving unit 27b. Accordingly, the amount of light received by the light receiving unit 27b is detected to be reduced due to the foreign matter blocking the light from the light emitting unit 27a, and foreign matter of a predetermined amount or more can be detected to be supported on the tray 21k.

When the optical sensor 27 detects that the foreign matter of a predetermined amount or more is supported on the tray 21k, the tray 21k moves to the storage position 30 as shown in FIG. 7C. When the tray 21k moves to the storage position 30, there is no support for the foreign matter at the support position 29, the foreign matter supported by the tray 21k falls, and the foreign matter is discharged to the outside by gravity. When the foreign matter supported on the tray 21k is discharged to the outside, the tray 21k becomes in a state of not supporting the foreign matter, and the tray 21k returns to the support position 29 shown in FIG. 7A. When the tray 21k returns to the support position 29 in FIG. 7A, the tray 21k closes the lower portion of the passage 18 and regulates the traveling wind.

In the present embodiment, when the light emitted from the light emitting unit 27a is blocked by foreign matter and the amount of light received by the light receiving unit 27b is reduced, the discharge mechanism 20 performs the discharge operation. Accordingly, an amount of foreign matter becoming a predetermined amount or more can be detected accurately. Therefore, foreign matter can be more reliably suppressed from blocking the traveling wind.

Fifth Embodiment

Next, the discharge mechanism 20 according to a fifth embodiment of the present invention will be described. Note that, description of a part configured in the same manner as the first embodiment to the fourth embodiment will be omitted, and only a different part will be described. The fifth embodiment is different from the first to fourth embodiments in that the discharge mechanism has a camera and detects that foreign matter enters the inside of the passage based on an image captured by the camera.

Figure 8A:
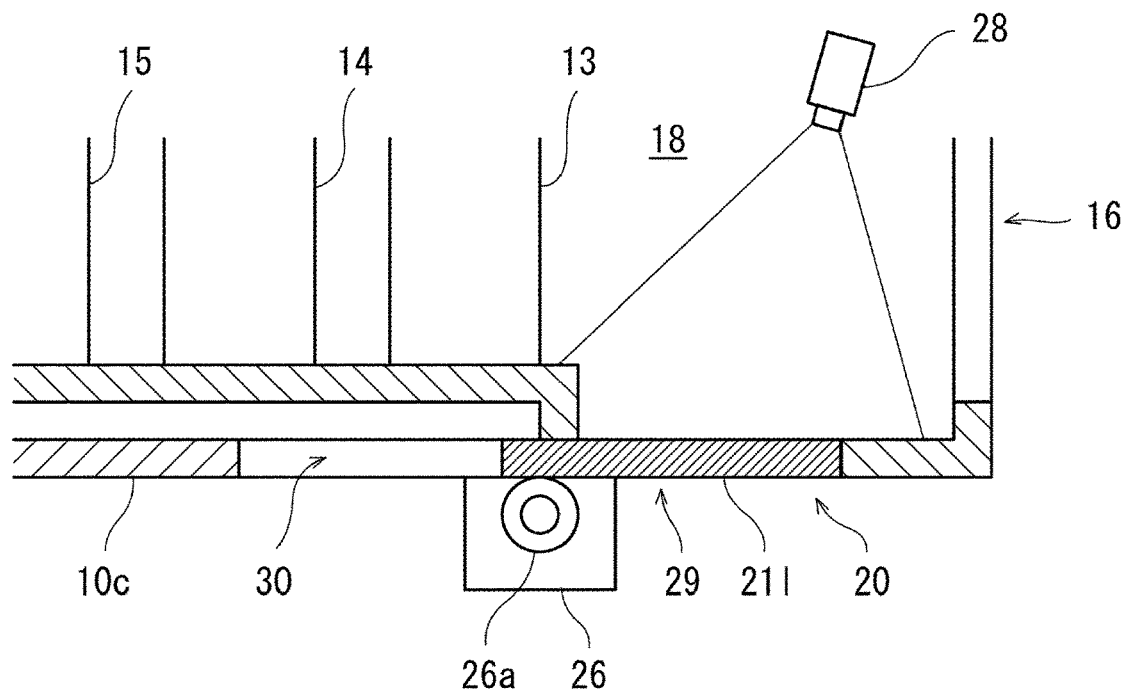
FIG. 8A is a cross-sectional view of the vicinity of the discharge mechanism in the absence of foreign matter of the utility vehicle according to a fifth embodiment.
Figure 8B:
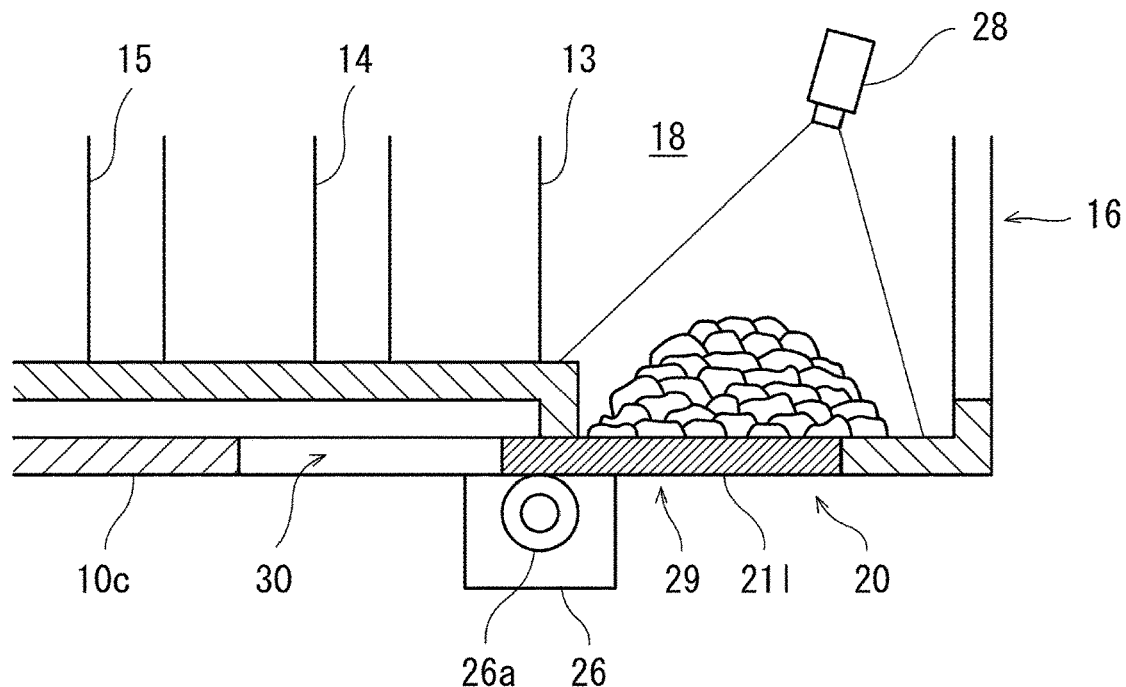
FIG. 8B is a cross-sectional view of the vicinity of the discharge mechanism in a state of containing the foreign matter.
Figure 8C:
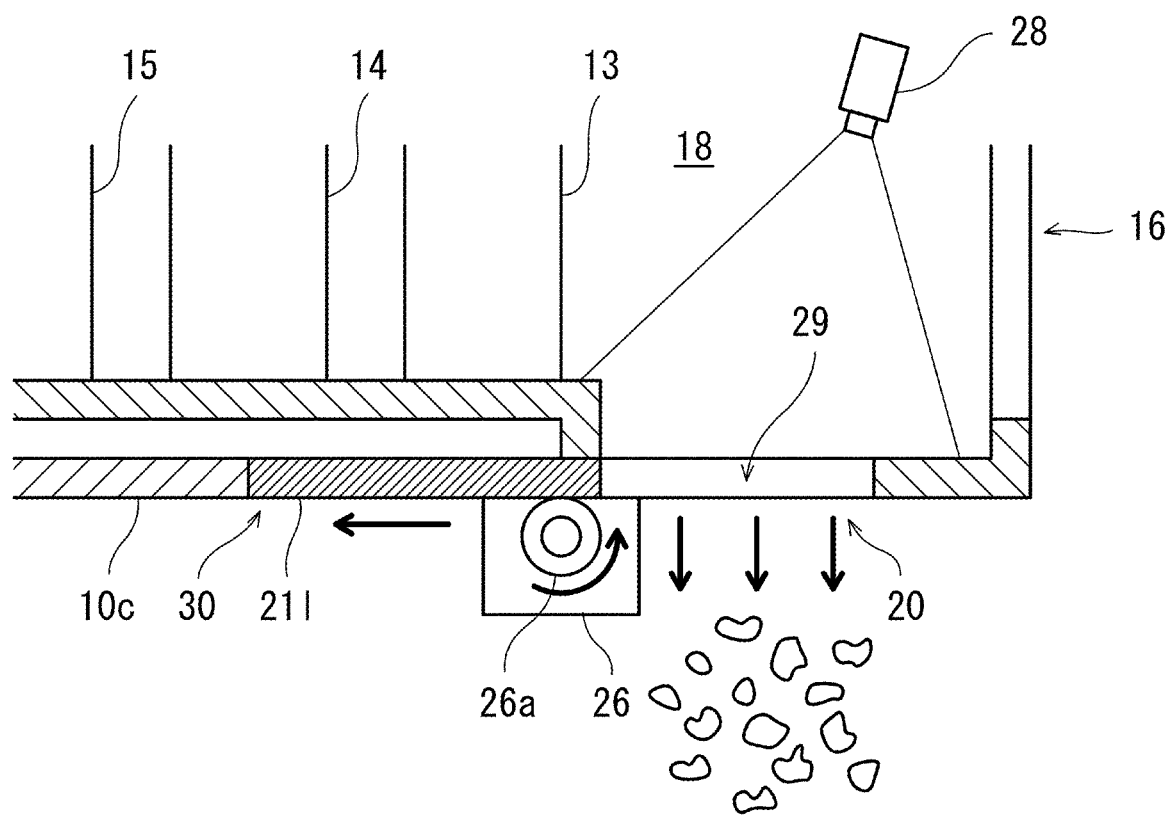
FIG. 8C is a cross-sectional view of the vicinity of the discharge mechanism in a state of discharging the foreign matter.

FIGS. 8A to 8C are cross-sectional views of the vicinity of the discharge mechanism 20 of the fifth embodiment. FIG. 8A shows a cross-sectional view of the vicinity of the discharge mechanism 20 in a state where no foreign matter is in the passage 18, FIG. 8B shows a cross-sectional view of the vicinity of the discharge mechanism 20 in a state where foreign matter enters the passage 18, and FIG. 8C shows a cross-sectional view of the vicinity of the discharge mechanism 20 in a state where the foreign matter is discharged by movement of the tray.

Referring to FIGS. 8A to 8C, description will be made on the discharge mechanism 20 that uses a camera to detect whether or not foreign matter enters the inside of the passage 18, and discharges the foreign matter when detecting that the foreign matter enters the passage 18.

A tray 21l is disposed at a position at the same height as the bottom cover 10c so as to be movable back and forth in the traveling direction. The motor 26 is disposed at a position below the tray 21l. The motor 26 has the drive shaft 26a. In the present embodiment, the motor 26 is disposed in such a manner that the drive shaft 26a abuts on the tray 21l so that the drive of the drive shaft 26a can be transmitted to the tray 211 when the drive shaft 26a rotates. The tray 211 can move from the position in FIG. 8A to the position in FIG. 8C or from the position in FIG. 8C to the position in FIG. 8A according to the drive of the drive shaft 26a. In the state where no foreign matter is supported on the tray 211 shown in FIG. 8A, the tray 211 is disposed at the support position 29 where foreign matter can be supported. The storage position 30 at which the tray 211 can be stored is provided at a position adjacent to the position where the tray 211 is disposed.

In the present embodiment, the discharge mechanism 20 has a camera 28 at a position closer to the passage 18 side than the bottom cover 10c. The camera 28 is disposed at a position closer to the passage 18 side than the bottom cover 10c. The camera 28 is configured to take an image of the inside of the passage 18. Based on the captured image, whether or not foreign matter enters the inside of the passage 18 can be recognized.

FIG. 8A shows a cross-sectional view of the vicinity of the discharge mechanism 20 in a state where there is no foreign matter inside the passage 18. In the state shown in FIG. 8A, the tray 211 is disposed at the support position 29, and the tray 211 closes the lower portion of the passage 18 and regulates the traveling wind. When the traveling wind enters the passage 18 from the opening 16, foreign matter enters the passage 18 through the opening 16 together with the traveling wind. In the present embodiment, foreign matter that enters the passage 18 is supported on the tray 211.

FIG. 8B shows a cross-sectional view of the vicinity of the discharge mechanism 20 in a state where foreign matter of a predetermined amount or more enters the inside of the passage 18. When a predetermined amount or more of foreign matter enters the inside of the passage 18, this fact is detected by an image captured by the camera 28. In the present embodiment, the utility vehicle 1 has a control unit. For example, the control unit stores an image in a state where a predetermined amount or more of foreign matter enters. The control unit compares the captured image with a stored image when a predetermined amount or more of foreign matter enters, so as to be able to detect whether or not a predetermined amount or more of foreign matter enters the inside of the passage 18.

When foreign matter of a predetermined amount or more is detected to be supported in the inside of the passage 18 using an image captured by the camera 28, the tray 211 moves from the support position 29 to the storage position 30 as shown in FIG. 8C. When the tray 211 moves to the storage position 30, there is no support for the foreign matter at the support position 29, the foreign matter in the inside of the passage 18 falls, and the foreign matter is discharged to the outside by gravity. When the foreign matter is discharged to the outside, there is a state in which no foreign matter is supported in the inside of the passage 18, and the tray 211 returns to the support position 29 shown in FIG. 8A. When the tray 211 returns to the support position 29 in FIG. 8A, the tray 211 closes the lower portion of the passage 18 and regulates the traveling wind.

In the present embodiment, when foreign matter is recognized to enter the inside of the passage 18 based on an image captured by the camera 28, the discharge mechanism 20 performs the discharge operation. Accordingly, an amount of foreign matter becoming a predetermined amount or more can be detected accurately. Therefore, foreign matter can be more reliably suppressed from blocking the traveling wind.

Note that, the above embodiment describes the mode in which the control unit recognizes whether or not a predetermined amount or more of foreign matter enters the inside of the passage 18. However, the present invention is not limited to the above embodiment. The tray 211 may be moved by manual operation when a person visually checks an image captured by the camera 28 and the person recognizes that a predetermined amount or more of foreign matter enters.

Other Embodiments

The above embodiment describes the mode in which whether or not a predetermined amount or more of foreign matter is stored in the tray 21 or the passage 18 is detected, and the discharge mechanism 20 discharges the foreign matter based on the detection result. However, the present invention is not limited to the above embodiment, and the discharge mechanism 20 may be configured to perform the discharge operation at regular time intervals. With the discharge mechanism 20 performing the discharge operation at regular intervals, an amount of foreign matter contained on the tray 21 or in the inside of the passage 18 can be suppressed to an amount smaller than a predetermined amount, without the detection of whether or not a predetermined amount or more of foreign matter is contained on the tray 21 or in the passage 18. Therefore, the configuration of the discharge mechanism 20 can be simplified.

Further, the above embodiment describes the mode in which whether or not an amount of foreign matter is a predetermined amount or more is detected, and the discharge mechanism 20 discharges the foreign matter based on the detection result. However, the present invention is not limited to the above embodiment, and the mode may be such that the discharge mechanism 20 discharges foreign matter when even a small amount of the foreign matter is contained.

What is claimed is:

1. A utility vehicle, comprising:
   a driving source;
   a vehicle body equipped with the driving source;
   an opening formed on the vehicle body, the opening through which traveling wind can be taken into the vehicle body when the vehicle body travels by driving of the driving source;
   a radiator capable of cooling a coolant for cooling the driving source by exchanging heat with traveling wind taken in from the opening;
   a passage that is provided between the opening and the radiator and guides the traveling wind taken in from the opening to the radiator; and
   a discharge mechanism that performs discharge operation to discharge foreign matter to outside when the foreign matter enters inside of the passage together with the traveling wind.

2. The utility vehicle according to claim 1, wherein the discharge mechanism performs the discharge operation when a predetermined amount or more of foreign matter enters the passage.

3. The utility vehicle according to claim 2, wherein
   the discharge mechanism includes a tray whose position can be changed between an open state in which the tray is opened when the foreign matter is discharged and a closed state when the foreign matter is not discharged, and a biasing member that biases the tray to a position of a closed state, and
   when gravity greater than or equal to a biasing force by the biasing member acts on the tray due to foreign matter having a predetermined weight or more placed on the tray, the tray moves to a position of an open state, and the discharge mechanism performs the discharge operation.

4. The utility vehicle according to claim 2, wherein the discharge mechanism includes a tray that supports the foreign matter in the inside of the passage when the foreign matter enters inside of the passage, and a motor that can move the tray, the tray is configured to be movable by driving of the motor between a support position at which the foreign matter is supported and a storage position at which the tray is stored in a storage portion, and the foreign matter supported by the tray at the support position is discharged to the outside by gravity when the tray moves from the support position to the storage position and the tray is stored in the storage portion.

5. The utility vehicle according to claim 2, wherein the discharge mechanism has a sensor that detects whether or not an amount of the foreign matter that enters inside of the passage is a predetermined amount or more, and the discharge mechanism performs the discharge operation when the sensor detects that the amount of the foreign matter is the predetermined amount or more.

6. The utility vehicle according to claim 5, wherein the sensor is a pressure sensor, and the discharge mechanism performs the discharge operation when a pressure detected by the pressure sensor is a predetermined pressure or more.

7. The utility vehicle according to claim 5, wherein the sensor is an optical sensor, the optical sensor has a light emitting unit and a light receiving unit, and the discharge mechanism performs the discharge operation when light emitted from the light emitting unit is blocked by the foreign matter accumulated in the inside of the passage and an amount of light received by the light receiving unit is reduced.

8. The utility vehicle according to claim 1, wherein the discharge mechanism performs the discharge operation at regular intervals.

9. The utility vehicle according to claim 1, wherein the discharge mechanism has a camera capable of recognizing whether or not the foreign matter enters inside of the passage based on an image, and the discharge mechanism performs the discharge operation when the foreign matter is recognized to enter inside of the passage based on an image captured by the camera.

10. The utility vehicle according to claim 1, further comprising an air conditioning mechanism for air-conditioning an inside of a vehicle interior in the vehicle body, wherein the air conditioning mechanism has a condenser capable of condensing a refrigerant by exchanging heat between a refrigerant and the traveling wind taken in from the opening, and the passage includes a condenser passage that is provided between the opening and the condenser and guides the traveling wind taken in from the opening to the condenser.

11. The utility vehicle according to claim 10, further comprising a fan that can take in a larger amount of traveling wind from the opening by rotating, wherein the passage includes a fan passage for taking in traveling wind from the opening when the fan rotates.

12. The utility vehicle according to claim 11, wherein the condenser, the radiator, and the fan are arranged in this order from front to rear of the vehicle body.

* * * * *